US009512505B2

(12) United States Patent
Weaver et al.

(10) Patent No.: US 9,512,505 B2
(45) Date of Patent: Dec. 6, 2016

(54) METHODS AND COMPOSITIONS FOR REPAIR OF COMPOSITE MATERIALS

(71) Applicant: GENERAL ELECTRIC COMPANY, Schenectady, NY (US)

(72) Inventors: Jared Hogg Weaver, Clifton Park, NY (US); Daniel Gene Dunn, Guilderland, NY (US)

(73) Assignee: General Electric Company, Niskayuna, NY (US)

( * ) Notice: Subject to any disclaimer, the term of this patent is extended or adjusted under 35 U.S.C. 154(b) by 47 days.

(21) Appl. No.: 14/522,016

(22) Filed: Oct. 23, 2014

(65) Prior Publication Data

US 2016/0114351 A1    Apr. 28, 2016

(51) Int. Cl.
| | | |
|---|---|---|
| *C04B 41/52* | (2006.01) | |
| *C22C 1/10* | (2006.01) | |
| *C04B 41/89* | (2006.01) | |
| *C04B 41/00* | (2006.01) | |

(52) U.S. Cl.
CPC .............. *C22C 1/10* (2013.01); *C04B 41/009* (2013.01); *C04B 41/52* (2013.01); *C04B 41/89* (2013.01)

(58) Field of Classification Search
CPC ................................... C04B 41/52
See application file for complete search history.

(56) References Cited

U.S. PATENT DOCUMENTS

| | | | | |
|---|---|---|---|---|
| 6,820,334 B2 * | 11/2004 | Kebbede | ................ | B23P 6/005 29/889.1 |
| 7,686,990 B2 * | 3/2010 | Gray | .................... | C04B 35/573 264/29.1 |
| 7,708,851 B2 | 5/2010 | Corman et al. | | |
| 2002/0160902 A1 * | 10/2002 | Lesniak | ................ | C04B 35/565 501/90 |
| 2005/0084665 A1 * | 4/2005 | DiChiara, Jr. | ...... | B28B 19/0053 428/293.4 |
| 2005/0276961 A1 * | 12/2005 | Sherwood | ............ | C04B 35/571 428/292.1 |
| 2006/0068159 A1 * | 3/2006 | Komori | .................... | B01J 35/04 428/116 |
| 2007/0164424 A1 * | 7/2007 | Dean | ....................... | H01L 23/42 257/707 |
| 2010/0015396 A1 | 1/2010 | Johnson et al. | | |
| 2011/0027484 A1 | 2/2011 | Kirby et al. | | |
| 2013/0022471 A1 | 1/2013 | Roberts, III et al. | | |
| 2013/0055559 A1 * | 3/2013 | Slocum | ............... | H01M 4/0478 29/623.1 |
| 2014/0272248 A1 | 9/2014 | Chamberlain | | |

* cited by examiner

*Primary Examiner* — Robert Vetere
(74) *Attorney, Agent, or Firm* — Paul J. DiConza

(57) ABSTRACT

A method for repair of composite materials includes applying a formulation to a ceramic matrix composite substrate. The formulation comprises a liquid carrier, a ceramic filler dispersed within the carrier, and a polymeric binder disposed in the carrier. The method further includes removing the carrier from the formulation to form a green composition; pyrolyzing the green composition to form a porous composition; disposing a liquid metal or metalloid within the pores of the porous composition to form an intermediate composite composition; and converting the liquid metal or metalloid to solid state to form a solid composite composition.

28 Claims, No Drawings

METHODS AND COMPOSITIONS FOR REPAIR OF COMPOSITE MATERIALS

BACKGROUND

This disclosure generally relates to a method for repairing articles made of ceramic composites. In particular, the present invention relates to a method for repairing articles made of fiber-reinforced ceramic matrix composites.

Reinforced ceramic matrix composites ("CMCs") comprising fibers dispersed in continuous ceramic matrices of the same or a different composition are well suited for structural applications because of their toughness, thermal resistance, high-temperature strength, and chemical stability. Such composites typically have high strength-to-weight ratio that renders them attractive in applications in which weight is a concern, such as in aeronautic applications. Their stability at high temperatures renders them very suitable in applications in which the components are in contact with a high-temperature gas, such as in gas turbine engine.

One process for the production of CMCs begins with producing a prepreg tape comprising fibers and a ceramic matrix or matrix precursor material. Fibers, such as ceramic fibers that have been coated with one or more materials to impart certain desired surface properties to them, are impregnated with a suspension comprising powder of the ceramic matrix or matrix precursor material and a temporary binder, and typically wound onto a drum to form the prepreg tape. The prepreg tape is dried and then cut into sections and formed into a fiber preform that is a porous object having a desired shape. The dried prepreg tape is still flexible and can be easily shaped. In another process, the preform is made first using tapes of woven fibers or fibers woven into three-dimensional structures, and fiber coatings are applied by chemical vapor infiltration. The porosity within the fiber preform is then filled with the matrix or matrix precursor material, which in many instances may be a molten metal or metalloid such as silicon, which eventually produces the finished continuous ceramic matrix surrounding the fibers. Silicon carbide fibers have been used as a reinforcing material for ceramic matrices, such as silicon carbide, titanium carbide, silicon nitride, and aluminum oxide. The filling of the fiber preform with the matrix precursor material and any attendant reaction between the matrix constituents already in the preform and the precursor material serve to densify the shaped object. This filling or densification may be achieved by chemical-vapor infiltration ("CVI") or liquid-phase infiltration by the matrix precursor material. Liquid-phase infiltration, often by a molten metalloid, is the preferred method because it is less time consuming and more often produces a fully dense body than the CVI process. Full densification is typically desired to achieve good thermal and mechanical properties and, thus, a long-term performance of CMCs.

Polymer infiltration and pyrolysis ("PIP") is another process for the production of CMCs. This process consists of: (1) infiltration of the composite reinforcement preform with one or more organo-metallic polymers, (2) densification or consolidation of the polymer-impregnated reinforcement preform, (3) cure of the polymer matrix to prevent melting during subsequent processing, and (4) pyrolysis and conversion of the cured polymer or polymers into the ceramic matrix. The polymer infiltration of a preform can be accomplished by either solution infiltration or melt infiltration. Ceramic composite matrices, such as silicon carbide, silicon nitride, silicon oxy-nitride, boron nitride, aluminum nitride, and mixtures thereof, can be prepared from the pyrolysis of respective precursor polymers.

CMCs are comparatively more expensive than more conventional materials because their typical production process is rather complicated. Therefore, it would be desirable to have a method for repairing CMC components that may be damaged during processing, handling, or use.

BRIEF DESCRIPTION

Embodiments of the present invention are provided to meet this and other needs. One embodiment is a method. The method includes applying a formulation to a ceramic matrix composite substrate. The formulation comprises a liquid carrier, a ceramic filler dispersed within the carrier, and a polymeric binder disposed in the carrier. The method further includes removing the carrier from the formulation to form a green composition; pyrolyzing the green composition to form a porous composition; disposing a liquid metal or metalloid within the pores of the porous composition to form an intermediate composite composition; and converting the liquid metal or metalloid to solid state to form a solid composite composition.

Another embodiment is a method. The method includes applying a formulation to a ceramic matrix composite substrate comprising silicon carbide. The formulation comprises an organic liquid carrier; a ceramic filler dispersed within the carrier, the filler comprising (i) a plurality of silicon carbide particles, and (ii) carbon black; a phenolic resin binder dissolved in the carrier; a polyvinyl butyral resin pore-forming agent dissolved in the carrier; a plasticizer; and a shrinkage control agent comprising carbon fiber dispersed within the carrier. The method further includes autoclaving the formulation to form a green composition; pyrolyzing the green composition to form a porous composition; disposing a quantity of liquid silicon or silicon-bearing alloy within the pores of the porous composition to form an intermediate composite composition; and converting the liquid silicon or silicon-bearing alloy to solid state to form a solid composite composition.

DETAILED DESCRIPTION

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function;

and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

In service, gas turbine components operate at gas temperatures frequently exceeding 1200° C. and are subjected to significant temperature gradients. In addition, these components are exposed to impact loading from particles having high velocity that are entrained in the hot gases. The severe service conditions render these components prone to various types of damage. Large thermal gradients can initiate cracks, for example at component edges or joint areas. Damage by foreign objects such as high-speed entrained particles can result in holes, indentations, or cracks that can propagate. Recession of the CMC surface can occur from interactions from the atmosphere, and the surface can be damaged from contact with molten dust materials, such as materials commonly referred to as CMAS (calcium-magnesium-aluminum-silicates). Embodiments of the present invention includes methods that may be applied for repairing damage in gas turbine engine components, and other high-temperature machinery components made of CMCs, thereby extending the life of these components. In addition, techniques described herein may be applied to repair damage in newly manufactured components thereby potentially reducing the number of defective or off-specification components.

One embodiment of the present invention includes a method in which a formulation is applied to a ceramic matrix composite substrate. The formulation may be applied to any desired area of the substrate. In some embodiments, the formulation is applied to a damaged portion of the substrate, meaning a portion that has sustained chipping, cracking, abrasion, erosion, recession, or other degradation. The formulation includes, among other things, a liquid carrier that is subsequently removed to form a green composition, which is then pyrolyzed to form a porous composition. A liquid metal or metalloid is disposed within the pores of the porous composition, such as by an infiltration method, and this liquid infiltrant is converted to the solid state, such as by reacting the infiltrant with the porous composition such that the final product is a solid composite composition. The solid composite composition typically comprises a reaction product (for instance, silicon carbide) and excess infiltrant (for instance, silicon-bearing material).

The ceramic matrix composite substrate to which the formulation is applied includes any composite material that includes a ceramic material as a matrix, with a reinforcement phase, such as fibers or particles, disposed within the matrix. In some embodiments, the formulation is designed to yield a finished product that is similar to the matrix composition of the substrate. One example of ceramic matrix composite material includes, without limitation, a silicon-carbide-reinforced silicon carbide composite such as composites of the types described in U.S. Pat. Nos. 5,015,540; 5,330,854; 5,336,350; 5,628,938; 6,024,898; 6,258,737; 6,403,158; and 7,708,851. Alternatively, other ceramic matrix composite materials are known in the art and may be used in embodiments described herein.

In one embodiment, the substrate is a component for a gas turbine assembly, such as an airfoil, a shroud, a combustor liner, or another component made from ceramic matrix composite materials.

The liquid carrier of the formulation is generally amenable to volatilization during processing, and is often selected such that it partially or fully dissolves one or more organic components of the formulation, such as the binder. In some embodiments, the liquid carrier comprises water or water-based solvents. In some embodiments, the liquid carrier comprises an organic liquid; examples of such liquids include organic-based solvents, toluene, xylene, methylethyl ketone, methyl-isobutyl ketone (4-methyl-2-pentanone, also referred to as MIBK), acetone, alcohols such as ethanol, methanol, isopropanol, n-butyl alcohol, 1,1,1-trichloroethane, tetrahydrofuran, tetrahydrofurfuryl alcohol, FSX-3 (a product distributed by Bargamo Corporation, Westport, Conn.), ethylene glycol monoethyl ether, ethylene glycol monobutyl ether, glacial acetic acid, acetone, butyl acetate, N-butyl alcohol, cyclohexane, diacetone alcohol, N,N-dimethylacetamide, N,N-dimethylformamide, dimethyl ester, dimethylsulfoxide, ethyl acetate, ethylene dichloride, isophorone, isopropyl acetate, methyl acetate, methylene chloride, N-methyl-2-pyrrolidone, propylene dichloride, SANTOSOAL® DME-1, tetrahydrofuran, toluene, or the like, or a combination comprising at least one of the foregoing. In particular embodiments, the liquid carrier includes toluene and methyl-isobutyl ketone.

The liquid carrier is typically present in the formulation in a range from about 5 weight percent to about 65 weight percent. In some embodiments, this range is from about 10 weight percent to about 50 weight percent. Selection of this range depends in part on many factors, among them the desired flow properties and shrinkage behavior of the resulting formulation.

A ceramic filler is included in the formulation. The filler is present, among other reasons, to provide the framework into which the liquid metal or metalloid is introduced during later processing, to supply one or more materials that ultimately participates in a reaction to form the solid composition of the processed material, and/or to add strength to the processed material. The ceramic filler is typically in a powder form, though other morphologies are possible. In one embodiment, the ceramic filler comprises a plurality of particles having a median diameter less than 10 micrometers. In certain embodiments, the median diameter is less than 5 micrometers, and in particular embodiments less than 1 micrometer. A finer particle size allows for higher surface area, better reactivity, and finer interparticle pores, all of which can be desirable in systems in which at least some of the particles are expected to react with the infiltrant during processing. Silicon carbide is one example of a material suitable for inclusion in the ceramic filler in some embodiments, and in particular embodiments, the ceramic filler further includes elemental carbon, such as carbon black, graphite particles, whiskers, flakes, or some other suitable form of carbon-containing material. In applying the methods described herein to repair of silicon carbide-containing composites, for instance, the carbon included in the ceramic filler may react with liquid silicon to form solid silicon carbide in the processed material.

The formulation generally further comprises a polymeric binder disposed in the carrier; the binder may be used to alter the flow properties of the formulation, such as by thickening the formulation to allow it to remain in place when applied to the substrate. Moreover, the binder provides useful characteristics to the formulation during processing. For example, the binder typically comprises one or more high-char-yielding resins, the addition of which increases strength of the material left behind after the pyrolysis step. The term "high-char-yielding resin" means that after pyrolysis, the resin decomposes and leaves behind solid material, such as carbon, silicon carbide, and silicon nitride. The high-charyielding resin provides integrity to the structure during pyrolysis and subsequent exposure to liquid metal or metalloid.

High-char-yielding resins that are suitable for use in the formulation include, for instance, carbon-forming resins and ceramic-forming resins. Examples of carbon-forming resins include phenolics, furan or furanic compounds, partially-polymerized resins derived therefrom, poly aryl acetylene, petroleum-tar based resins, and coal tar-based resins. In one embodiment, the binder comprises a phenolic resin and furfuryl alcohol. Ceramic-forming resins comprise those resins that upon pyrolyzation form a solid phase (crystalline or amorphous) that includes one or more of the following: silicon carbide, carbon, silicon nitride, silicon-oxycarbides, silicon-carbonitrides, boron carbide, boron nitride, and metal carbides or nitrides, where the metal is generally zirconium, titanium, or a combination comprising at least one of the foregoing metals. Further examples are polycarbosilanes, polysilanes, polysilazanes, and polysiloxanes. Typically the binder is present in the formulation at a concentration chosen to provide desired mechanical properties (e.g., flow properties in the original formulation, strength in the pyrolized product) and desired level of carbon or other residue after pyrolysis; generally the concentration in the formulation is in a range from about 1 weight percent to about 40 weight percent, and in particular embodiments the range is from about 4 weight percent to about 20 weight percent.

In some embodiments, the formulation further comprises a shrinkage control agent, which provides a measure of rigidity to the formulation as it is processed; in particular, the mass loss associated with volatilizing the liquid carrier and converting the binder to char creates a driving force to shrink the size of the remaining material. Excessive shrinkage can lead to undesirable cracking within the product material. The shrinkage control agent, then, provides mechanical support to mitigate the tendency to shrink.

The shrinkage control agent may be in any form suitable to provide the described function; examples include particulates and fibers. The size of the agent is selected such that shrinkage is controlled while maintaining the desired flow properties and such that the shrinkage control agent does not reduce the ability to be densified with the liquid metalloid infiltrant. In one embodiment, a fiber-shaped shrinkage control agent has an aspect ratio in the range from 3 to 30. Aspect ratio in part determines the amount of shrinkage control agent required, the degree of entanglement of the shrinkage control agent with itself, and the propensity for the shrinkage control agent to develop a preferred alignment during application. Median fiber length for fibers making up the shrinkage control agent are typically in the range from about 75 to about 250 micrometers with median diameter in the range from 5 to 15 micrometers. Where the shrinkage control agent is in the form of particles, such as ceramic particles, including, for example, silicon carbide particles, typical median size is at least about 10 micrometers. Particles may be used at concentrations up to about 60 weight percent, while fibers are typically used up to about 20 weight percent of the formulation.

In one embodiment, a shrinkage control agent comprising carbon-containing filamentary material, such as chopped or milled carbon fibers, can be added to the formulation. In one embodiment, milled carbon fibers are used at a concentration in the range from about 1 weight percent to about 5 weight percent. Carbon-containing filamentary materials may be largely, though perhaps not entirely, consumed during infiltration with molten silicon as a result of reacting with silicon to form silicon carbide. Any residual amount of carbon remaining is believed to be in sufficiently small amounts to have no effect on the mechanical or thermal stability or oxidation resistance of the product formed after processing. In addition to or instead of carbon, other compatible materials could foreseeably be used as the material for the shrinkage control agent, such as silicon carbide particles or fiber. It is also possible that a polymeric fiber (e.g., a nylon, cellulose, polyethylene, etc.) could be used as the shrinkage control agent, as long as such materials have requisite mechanical and thermo-chemical properties.

In some embodiments, the formulation further comprises a pore-forming agent disposed in the liquid carrier. Although the process described herein naturally provides a porous structure due to the removal of liquid carrier and to the reduction in mass achieved during pyrolysis, the formation of pores may be desirably augmented through the use of a pore-forming agent, which is typically a solid, often soluble in the carrier, with a lower vapor pressure than the carrier to allow the pore-forming agent to remain behind as a residue while the carrier is being volatilized. The pore-forming agent is typically removed, such as by burning out during the pyrolysis step, at a higher temperature after removal of the carrier. In some embodiments, the pore-forming agent is an organic material, albeit a lower char-yielding composition than the binder. Examples of materials suitable for use as the pore-forming agent include polyvinyl butyral (PVB) resin, acrylics, acetates, and cellulosics. A typical concentration for the pore-forming agent is up to about 15 weight percent of the formulation, and in certain embodiments the pore-forming agent is present in a concentration from about 2 weight percent to about 10 weight percent.

Other additives are applied to the formulation in certain embodiments. For example, where the formulation is desired to behave as a thick paste or to exhibit flexibility, as in where the formulation is applied via tape, a plasticizer optionally may be added to the formulation. Examples of plasticizers include triethylene glycol bis(2-ethylhexanoate) (available commercially, for instance, via Solutia, Inc. under the SOLUSOLV trade name), dibasic esters, glycols, and phthalates. Typically plasticizer is used at a concentration up to about 15 weight percent of the formulation, and in particular embodiments is present in a range from about 2 weight percent to about 6 weight percent. Moreover, dispersants, typically surfactants chosen for compatibility with the carrier, are used in some embodiments to improve the separation of solids (such as the ceramic filler particles) within the formulation, thereby reducing agglomeration. Typically, dispersants are used in the formulation at concentrations of up to about 5 weight percent, and in some embodiments the concentration is in the range from about 1 weight percent to about 3 weight percent.

In some embodiments of the present invention, the method includes the step of creating the aforementioned formulation. Typically, this includes combining the liquid carrier, ceramic filler, polymeric binder, and any optional ingredients together and mixing for a period of time to dissolve all of the soluble materials in the carrier, to deagglomerate any agglomerates, and to disperse the filler particles. Mixing here and elsewhere in the process involves using shear force, extensional force, compressive force, ultrasonic energy, electromagnetic energy, thermal energy or combinations comprising at least one of the foregoing forces or forms of energy, and can be conducted in processing equipment wherein the aforementioned forces or forms of energy are exerted by a single screw, multiple screws, intermeshing co-rotating or counter rotating screws, nonintermeshing co-rotating or counter rotating screws, reciprocating screws, screws with pins, screws with screens, barrels with pins, rolls, rams, helical rotors, or combinations comprising at least one of the foregoing types of processing equipment. Mixing involving the aforementioned forces may be conducted in machines such as single or multiple screw extruders, Buss kneader, Henschel, helicones, Ross mixer, Banbury, roll mill, ball mill, a paint shaker, planetary centrifugal mixer, or the like, or combinations comprising at least one of the foregoing machines.

Mixing by, for instance, ball milling all of the formulation ingredients together is a convenient method for forming the formulation. In some embodiments, however, the shrinkage control agent is not added during this first mixing step. In particular embodiments, such as in some instances where carbon fiber is used as the shrinkage control agent, the fibers are added after ball milling to avoid undue damage, and associated dimensional changes, to the fiber. Moreover, the addition of the fiber thickens the formulation, in some cases to the point where it could not be effectively mixed without the addition of more carrier. Instead, in these embodiments a slurry is formed by mixing via, for instance, ball milling, the liquid carrier with the filler (and optionally other ingredients), and then dispersing the fiber within this slurry using a centrifugal planetary mixer. This method for mixing the fiber allows for efficient mixing even where the formulation has a high viscosity, maintains the mechanical integrity of the fiber, and allows for subsequent removal of air from the formulation without the need to use a vacuum (use of which may undesirably remove carrier liquid prematurely).

The area on the substrate around the damage may be advantageously cleaned by a mechanical or a chemical method before a portion of the formulation is applied thereto. These cleaning actions promote adhesion between the formulation and the substrate and any subsequent inter-diffusion of materials therebetween. For example, the damaged area may be abraded by a mechanical action. Alternatively, or additionally, the substrate may be treated in a reducing atmosphere to remove surface oxides. Such a reducing atmosphere may comprise a gas such as hydrogen, carbon monoxide, or mixtures of one of these gases with an inert gas (for example, nitrogen, argon, or helium). Liquid-based chemical cleaning processes, such as those disclosed in U.S. patent application Ser. No. 14/014,462, may also be employed as appropriate.

In one embodiment of the present invention, material around the area of the substrate to which the formulation is to be applied (such as an area of damage as noted previously) is removed to form a depression in which a quantity of the formulation having appropriate shape, size, and composition can be positioned. The depression may take one of several different forms, such as any irregular shape, a cylinder, inverted prism, inverted cone, or inverted truncated cone, to name a few possibilities.

The formulation is applied to the substrate using any practical method to position the formulation onto the desired region of the substrate. In one embodiment, the formulation is applied as a tape. Tapes comprising the formulation may be readily fabricated by, for instance, using a doctor blade to spread a desired quantity of the formulation onto a thin backing sheet—a well-known process commonly referred to in the art as "tape casting." The tapes may be applied to the surface using tape application methods well known in the art of composite fabrication, including manual application and automated methods of application. In alternative embodiments, the formulation is applied without a backing sheet as a free-standing quantity of material. Depending on the selected composition (for example, the relative amounts of plasticizer, solids, binder, and/or carrier liquid, etc.), the formulation may be quite viscous, as a paste for instance, or less viscous, as a paint layer for instance. This quantity of material is applied to the surface using a method or combination of methods that is appropriate to the flow properties of the selected formulation and the nature of the area to which the formulation is to be applied. For example, in one embodiment, the formulation is applied by mechanically spreading the formulation, as by brushing, spraying, trowelling, and the like. In alternative embodiments, the formulation is applied to the substrate by injection using a pressure-driven applicator, such as a syringe for example. Injection techniques offer potential advantage in that, where fibers are used as a shrinkage control agent in the formulation, there may be higher potential of maintaining a random relative orientation of fibers in the applied material, contrasted with trowelling techniques that may in some cases tend to promote alignment of fibers. A more random orientation often provides better overall shrinkage control. Regardless of the technique used to apply the formulation, sufficient quantity is applied to promote coverage of damage and to form a finished surface for the substrate having a desired set of dimensions, such as to restore a chipped surface to an acceptably smooth surface in view of, for example, part drawings or other specifications.

After the formulation is applied to the substrate, the carrier is removed from the formulation, thereby forming a so-called "green" composition, that is, a composition that retains at least a portion of the binder because it has not yet been pyrolyzed or otherwise chemically altered to remove or convert the binder. Generally, the carrier is removed by heating the formulation to a temperature at which the carrier's vapor pressure is sufficiently high to drive volatilization at a rate that is economically feasible without unduly damaging the formulation as it is being processed, and/or the article being fabricated or repaired with the formulation. By way of illustration, where an organic liquid carrier is used in the formulation, removing the carrier is often performed beginning at ambient temperature, then heating up to a temperature above about 100 degrees Celsius. In one embodiment, removing the carrier is performed by heating the formulation at ambient pressure, as in an oven or furnace, or by irradiating the treated area containing the formulation with a heat lamp. In alternative embodiments, removing the carrier is done by heating in an autoclave at pressure higher than 1 atmosphere (about 100 kilopascals), which may advantageously promote closing of air pockets and other larger pores within the formulation. The duration of the carrier removal step is selected to substantially completely remove the carrier. As an example, in some embodiments the removal is conducted at a temperature in the range from 100 to about 175 degrees Celsius, at a pressure in a range from about 300 kilopascals to about 700 kilopascals, for a time in the range 5 to about 25 hours.

The green composition is then pyrolyzed (often referred to in the art as "burn-out") to form a porous composition. The step of pyrolyzing typically includes heating the green composition (often along with the substrate upon which the green composition is disposed) to a temperature greater than or equal to about 400 degrees Celsius. The pyrolysis heat treatment is conducted in a vacuum or in an inert atmosphere to promote char yield and to avoid oxidizing the substrate. In one embodiment, green composition is heated to a temperature of about 600 degrees Celsius to about 1000 degrees Celsius. The time period of the heat treatment is typically about 10 to about 240 minutes, but longer times may be used as desired, such as where large parts are to be processed. In the embodiment being described, the pyrolysis heat treatment serves at least two functions. The first is a controlled burn-out of the organic materials in the green composition. The outgassing due to the decomposition of these materials can damage the substrate and/or the green composition if done too quickly. Additionally, at least one of the organics is a char-yielding material as described above. It is desirable to have sufficient char to provide the porous composition with adequate strength after pyrolysis. The pyrolysis is typically conducted in a substantially inert atmosphere, such as nitrogen or argon, or in vacuum, to preserve the carbon char as well as any carbon particulates or fibers used in the formulation.

A liquid metal or metalloid, such as liquid silicon or silicon-bearing alloy, is then disposed within the pores of the porous composition, thereby forming an intermediate composite composition. Typically the disposition of liquid metal or metalloid is achieved via an infiltration process. Methods for infiltrating liquid silicon, for instance, into porous bodies is well-described in the art of composites, and any of these methods may be suitable for use in embodiments of the present invention, depending in part on the size and disposition of the area being treated and the nature of the substrate. Generally, a source of silicon or other infiltrant in block or powder form is brought into contact with the pores of the porous composition, and this resulting assembly is heated to a temperature above the melting point of the infiltrant, thereby placing the source in fluid communication with the pores of the porous composition; capillary action drives liquid infiltrant into the pores of the porous composition.

As the liquid metal or metalloid infiltrant is disposed within the pores of the porous composition, a converting step takes place wherein the liquid is converted to the solid state, thereby forming a solid composite composition. Conversion may include simple solidification of the infiltrant, but often includes at least some chemical conversion, typically in the form of reaction with material of the porous composition to form a solid reaction product. For example, liquid silicon or silicon-bearing alloy converts carbon in the porous composition into solid silicon carbide and thus fills remaining voids. Depending on the relative amounts of infiltrant and chemical components of the porous composition, some residual infiltrant and unreacted carbon or other component may reside in the solid composite composition.

This disposing of liquid infiltrant and conversion treatment is generally conducted under vacuum or substantially inert atmosphere, such as a vacuum at pressures of about 2 Torr (0.3 kilopascals) to about 1 mTorr (0.0001 kilopascals). The temperature for these steps can be as high as 1800 degrees Celsius. In an exemplary embodiment, the infiltration is conducted at a temperature of about 1400 degrees Celsius to about 1450 degrees Celsius. The period of time required for infiltration is determinable empirically and depends largely on the size of the region being treated and the extent of infiltration desired; the amount of time is typically on the order of a few minutes to about 3 hours, but may be longer if conditions dictate. The pyrolysis and infiltration steps can be combined into one cycle, or can be done separately.

The resulting solid composite composition resides on the substrate and may be subjected to further processing as desired. For instance, a machining operation such as grinding or polishing may be performed to provide a desired surface finish or to alter the dimensions of the substrate and/or the solid composite composition disposed thereon.

EXAMPLES

The following examples are presented to further describe embodiments of the present invention, but should not be read as limiting, because variations still within the scope of embodiments of the present invention will be apparent to those skilled in the art.

As a general summary of the techniques described above, an illustrative specific embodiment of the described method includes applying a formulation to a ceramic matrix composite substrate comprising silicon carbide, wherein the formulation comprises an organic liquid carrier, a ceramic filler dispersed within the carrier, with the filler comprising (i) a plurality of silicon carbide particles having a median diameter of less than 10 micrometers, and (ii) carbon black, a phenolic resin binder dissolved in the carrier, a polyvinyl butyral resin pore-forming agent dissolved in the carrier, a plasticizer, and a shrinkage control agent comprising carbon fiber dispersed within the carrier; autoclaving the formulation to form a green composition; pyrolyzing the green composition to form a porous composition; disposing a quantity of liquid silicon or silicon-bearing alloy within the pores of the porous composition to form an intermediate composite composition; and converting the liquid silicon or silicon-bearing alloy to solid state to form a solid composite composition.

As an illustrative example, a formulation was made in accordance with the techniques described above. First, a putty base was formed using the ingredients in Table 1.

TABLE 1

| Ingredients | wt (g) |
| --- | --- |
| MIBK | 36.4 |
| Toluene | 56 |
| Furfuryl Alcohol-Phenolic Resin blend | 28 |
| Organic solvent mixture (Cotronics 931 Thinner) | 28 |
| Silicon carbide powder, median diameter 0.5 micrometers | 140 |
| Carbon black | 60 |
| Pore-former (Butvar) | 16 |
| Plasticizer (Solusolv S2075) | 16 |
| Dispersant (Zephrym PD7000) | 6 |

The toluene, MIBK, furfuryl alcohol-phenolic resin blend, Cotronics 931, and Zephrym PD7000 were added to a 1 liter bottle containing 400 g zirconia milling media, and the mixture was mixed for 3 minutes in a vortex paint mixer. The silicon carbide powder and carbon black powder was then added to the mixture and mixed for 30 minutes in the paint mixer. The Butvar and Solusolv were added to the bottle and further mixed for 4 hours in the paint mixer. The intense mixing action may help to break up agglomerates, disperse the fine particles, and dissolve the pore-former and other components. The heat generated during the mixing may also help to increase the solvating power of the carriers, improve dissolution of the pore-former, and reduce the solution viscosity, which aids in the mixing process.

To ensure proper mixing, an aliquot was taken from the mixture, smeared on a glass slide, and optically examined for agglomerates or undissolved solids. Mixing continued until such examination showed a smooth mixture.

After mixing, 2 grams of carbon fiber of nominal diameter 12 micrometers and nominal length 200 micrometers was added to 100 grams of the putty base mixture and mixed in a planetary centrifugal mixer without vacuum for 4 minutes at 1500 rpm to form the finished formulation.

The formulation was applied to several test specimens made of silicon carbide-silicon carbide ceramic matrix composite that included simulated damaged regions. The formulation was applied to these regions with a putty knife and spread in a manner to minimize formation of air pockets and substantial alignment of carbon fiber. The resulting patches were allowed to dry overnight at room temperature. The samples were then placed in a vacuum bag and autoclaved for 18 hours at 125 degrees Celsius at a pressure of 0.7 megapascals to finish removing the carrier and further densify the patch. The patch, now a green formulation in the context of the techniques set forth herein, was then pyrolyzed in a furnace at 565 degrees Celsius for 3 hours to form a porous composition in the patch. The samples were heated to about 1435 degrees Celsius for about 5 minutes to infiltrate, via a carbon fiber wick, the pores of the porous composition with a molten silicon-boron alloy. The resulting patches were tested using a tensile pull test, and the results showed that the stress at failure for the repaired sections was statistically indistinguishable from similar testing performed on undamaged substrate material. All failures were observed to be within the substrate itself, indicating very good adhesion to the substrate and cohesion within the repaired regions.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
    applying a formulation to a ceramic matrix composite substrate, wherein the formulation comprises
        a liquid carrier,
        a ceramic filler dispersed within the carrier, and
        a polymeric binder disposed in the carrier;
    removing the carrier from the formulation to form a green composition;
    pyrolyzing the green composition to form a porous composition;
    disposing a liquid metal or metalloid within the pores of the porous composition to form an intermediate composite composition; and
    converting the liquid metal or metalloid to solid state to form a solid composite composition.

2. The method of claim 1, wherein the formulation further comprises a shrinkage control agent.

3. The method of claim 2, wherein the shrinkage control agent comprises carbon fiber.

4. The method of claim 3, wherein the carbon fiber has a length less than about 250 micrometers.

5. The method of claim 3, wherein the fiber has an aspect ratio of at least about 5.

6. The method of claim 2, wherein the shrinkage control agent comprises a plurality of particles having a median diameter of at least about 10 micrometers.

7. The method of claim 6, wherein the plurality of particles comprises silicon carbide particles.

8. The method of claim 1, wherein the formulation further comprises a plasticizer.

9. The method of claim 1, wherein the ceramic filler comprises a plurality of particles having a median diameter less than 10 micrometers.

10. The method of claim 9, wherein the median diameter is less than 1 micrometer.

11. The method of claim 1, wherein the ceramic filler comprises silicon carbide.

12. The method of claim 11, wherein the ceramic filler further comprises elemental carbon.

13. The method of claim 1, wherein the liquid carrier comprises an organic liquid.

14. The method of claim 1, wherein the binder is at least partially dissolved in the carrier.

15. The method of claim 1, wherein the binder comprises a phenolic resin, a furan or furanic-based resin, a petroleum-tar-based resin, a coal tar-based resin, a polyarylacetylene, or combinations thereof.

16. The method of claim 1, wherein the binder comprises a phenolic resin and furfuryl alcohol.

17. The method of claim 1, wherein the formulation further comprises a pore-forming agent disposed in the carrier.

18. The method of claim 17, wherein the pore-forming agent comprises polyvinyl butyral resin, an acrylic resin, an acetate resin, a cellulosic resin, or combinations thereof.

19. The method of claim 1, wherein applying comprises mechanically spreading or injecting the formulation onto the substrate.

20. The method of claim 1, wherein removing the carrier comprises heating formulation in an autoclave under a pressure greater than 1 atmosphere.

21. The method of claim 1, wherein pyrolyzing comprises heating the green composition to a temperature in a range from about 400 degrees Celsius to about 1000 degrees Celsius.

22. The method of claim 1, wherein pyrolyzing comprises heating in a vacuum or in a substantially inert atmosphere.

23. The method of claim 1, wherein the liquid metal or metalloid comprises silicon.

24. The method of claim 1, wherein disposing the liquid metal or metalloid comprises disposing a silicon source in fluid communication with the pores of the porous composition, and infiltrating the pores with liquid silicon.

25. The method of claim 1, wherein converting the liquid metal or metalloid to solid state comprises reacting the metal or metalloid with the porous composition.

26. The method of claim 1, further comprising performing a machining operation on the solid composite composition.

27. The method of claim 1, further comprising forming the formulation, wherein forming the formulation includes dispersing carbon fibers into a slurry comprising the carrier using a centrifugal planetary mixer.

28. A method comprising:
    applying a formulation to a ceramic matrix composite substrate comprising silicon carbide, wherein the formulation comprises
        an organic liquid carrier,
        a ceramic filler dispersed within the carrier, the filler comprising (i) a plurality of silicon carbide particles, and (ii) carbon black,
        a phenolic resin binder dissolved in the carrier,
        a polyvinyl butyral resin pore-forming agent dissolved in the carrier,
        a plasticizer, and
        a shrinkage control agent comprising carbon fiber dispersed within the carrier;
    autoclaving the formulation to form a green composition;

pyrolyzing the green composition to form a porous composition;
disposing a quantity of liquid silicon or silicon-bearing alloy within the pores of the porous composition to form an intermediate composite composition; and
converting the liquid silicon or silicon-bearing alloy to solid state to form a solid composite composition.

* * * * *